(12) United States Patent
Yoshida

(10) Patent No.: US 9,544,557 B1
(45) Date of Patent: Jan. 10, 2017

(54) VIDEO SIGNAL PROCESSING DEVICE AND PROJECTION-TYPE DISPLAY DEVICE

(71) Applicant: JVC KENWOOD Corporation, Yokohama-shi, Kanagawa (JP)

(72) Inventor: Atsushi Yoshida, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 15/092,666

(22) Filed: Apr. 7, 2016

(30) Foreign Application Priority Data

Jun. 24, 2015 (JP) ................................. 2015-126137

(51) Int. Cl.
*H04N 9/31* (2006.01)

(52) U.S. Cl.
CPC .......... *H04N 9/3185* (2013.01); *H04N 9/3188* (2013.01)

(58) Field of Classification Search
CPC ....................................................... H04N 9/31
USPC ......................................................... 348/746
See application file for complete search history.

(56) References Cited

U.S. PATENT DOCUMENTS

| 5,975,703 | A | * | 11/1999 | Holman | ............. | G03B 21/2073 |
| | | | | | | 349/9 |
| 2011/0002020 | A1 | * | 1/2011 | Khan | ................... | G03H 1/2286 |
| | | | | | | 359/22 |

FOREIGN PATENT DOCUMENTS

| JP | 2004-246242 A | 9/2004 |
| JP | 5010262 B2 | 6/2012 |

* cited by examiner

*Primary Examiner* — Brian Yenke
*Assistant Examiner* — Sihar Karwan
(74) *Attorney, Agent, or Firm* — Nath, Goldberg & Meyer; Jerald L. Meyer; Stanley N. Protigal

(57) ABSTRACT

A black stripe detector is configured to detect whether or not each pixel of an input video signal is a pixel in a black stripe region, and to generate a black stripe identification signal. A signal combiner is configured to combine the input video signal and the black stripe identification signal with each other to generate a combination signal. A keystone correction processor is configured to implement keystone correction processing for the combination signal, and to generate a keystone-corrected video signal. A signal separator is configured to separate the keystone-corrected combination signal into a keystone-corrected video signal and a keystone-corrected black stripe identification signal. A video signal processor is configured to implement predetermined video signal processing for the keystone-corrected video signal by using the keystone-corrected video signal and the keystone-corrected black stripe signal.

7 Claims, 4 Drawing Sheets

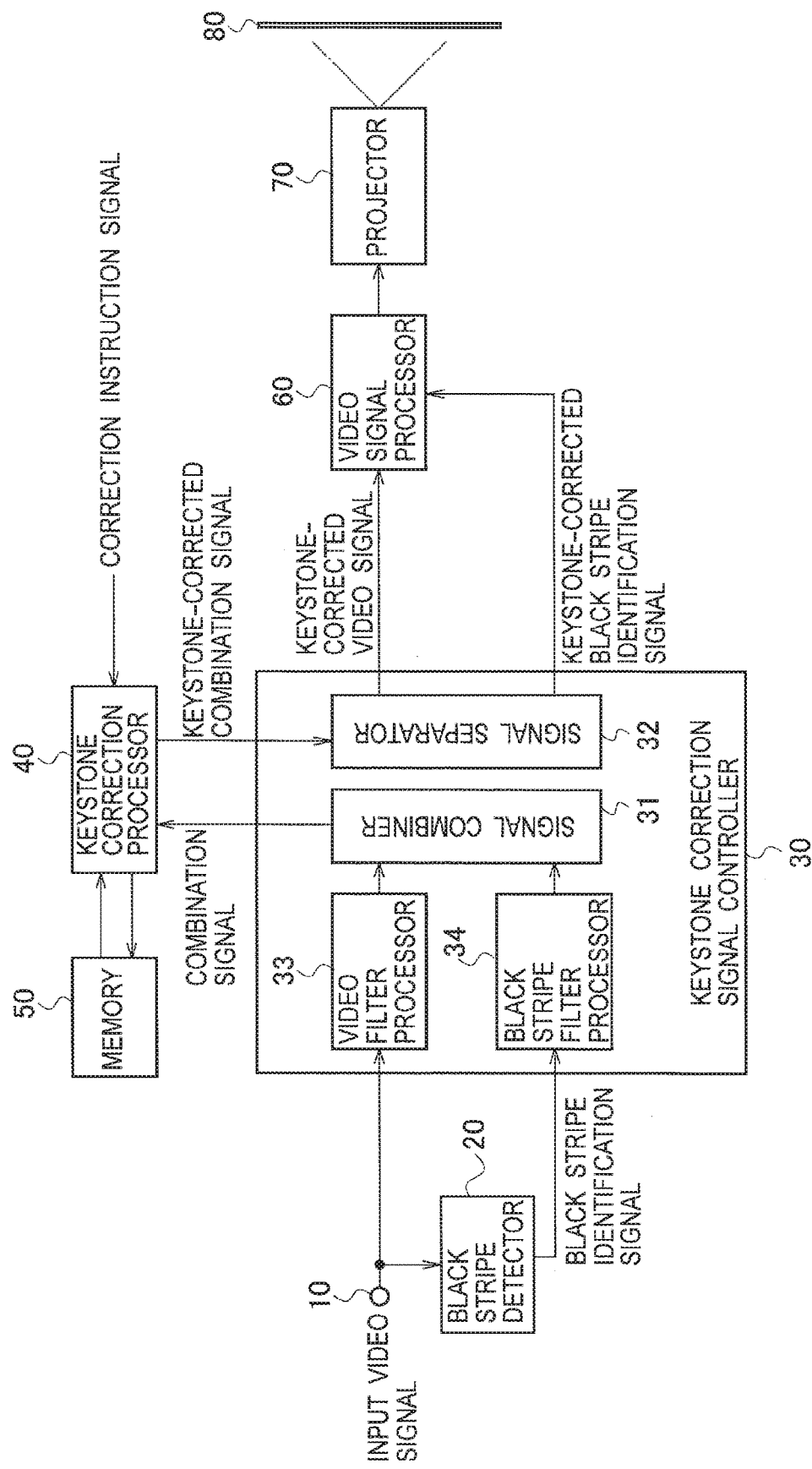

VIDEO SIGNAL PROCESSING DEVICE AND PROJECTION-TYPE DISPLAY DEVICE

CROSS REFERENCE TO RELATED APPLICATION

This application is based upon and claims the benefit of priority under 35 U.S.C. §119 from Japanese Patent Application No. 2015-126137, filed on Jun. 24, 2015, the entire contents of which are incorporated herein by reference.

BACKGROUND

The present disclosure relates to a video signal processing device and a projection-type display device.

As aspect ratios of an effective region of a video signal, various types are present, which include: 4:3 of the NTSC system; 16:9 of the high vision system; 1.375:1 for use in a movie, and the like. For example, in order to create a video signal with an aspect ratio of 16:9 based on a video signal with an aspect ratio of 4:3, black stripe regions are often added on the right and left sides of a video region with the aspect ratio of 4:3 to create a video signal with the aspect ratio of 16:9.

As described above, when creating a video signal with another aspect ratio based on a video signal with a certain aspect ratio, in some cases, the black stripe regions are added to the upper and lower or right and left sides of the video region, and the video signal with another aspect ratio is created.

SUMMARY

Incidentally, when displaying a video which is based on a video signal on a screen by a projection-type display device (a so-called projector), in the case of projecting video light from an oblique direction with respect to the screen in the horizontal direction or the vertical direction, the video displayed on the screen is distorted into a trapezoid. Accordingly, the projection-type display device mounts thereon a keystone correction function to correct such a trapezoidal video into a rectangle.

In recent years, demand for improved image quality of the display video has been increased, and in some cases, the projection-type display device has mounted thereon a video signal processing function to improve the image quality of the display video by increasing the amount of information of the video signal, and so on.

In the case where the video signal with the added black stripe regions is inputted to the projection-type display device that mounts thereon the keystone correction function and the video signal processing function, it is necessary for the projection-type display device to further mount thereon a black stripe region detection function to detect the black stripe regions. When processing the video signal by the video signal processing function, the black stripe region detection function is necessary.

When the projection-type display device is mounted with the black stripe region detection function, the keystone correction function, and a predetermined video signal processing function, unless the respective functions are executed in an appropriate order, then in some cases, some of the functions may not be executed appropriately, or the cost of the device is increased unnecessarily due to an increase of bandwidth or capacity of a memory.

A first aspect of the embodiments provides a video signal processing device including: a black stripe detector configured to detect whether or not each pixel of an input video signal, in which a part of an effective region is a black stripe region, is a pixel included in the black stripe region, and to generate a black stripe identification signal; a signal combiner configured to combine the input video signal and the black stripe identification signal with each other and to generate a combination signal; a keystone correction processor configured to implement keystone correction processing for the combination signal so as to correct a trapezoidal distortion when the input video signal is projected onto a screen, and to generate a keystone-corrected combination signal; a signal separator configured to separate the keystone-corrected combination signal into a keystone-corrected video signal subjected to the keystone correction processing and a keystone-corrected black stripe identification signal indicating whether or not each pixel of the keystone-corrected video signal is a pixel included in a black stripe region; and a video signal processor configured to implement predetermined video signal processing for the keystone-corrected video signal by using the keystone-corrected video signal and the keystone-corrected black stripe signal.

A second aspect of the embodiments provides a projection-type display device including: the above-mentioned video signal processing device; and a projector configured to project a video signal which is outputted from the video signal processor onto the screen.

BRIEF DESCRIPTION OF THE DRAWINGS

FIG. 5 is a block diagram showing a video signal processing device and a projection-type display device according to the second embodiment.

DETAILED DESCRIPTION

A description is made below of video signal processing devices and projection-type display devices according to the respective embodiments with reference to the accompanying drawings.

First Embodiment

Figure 1:
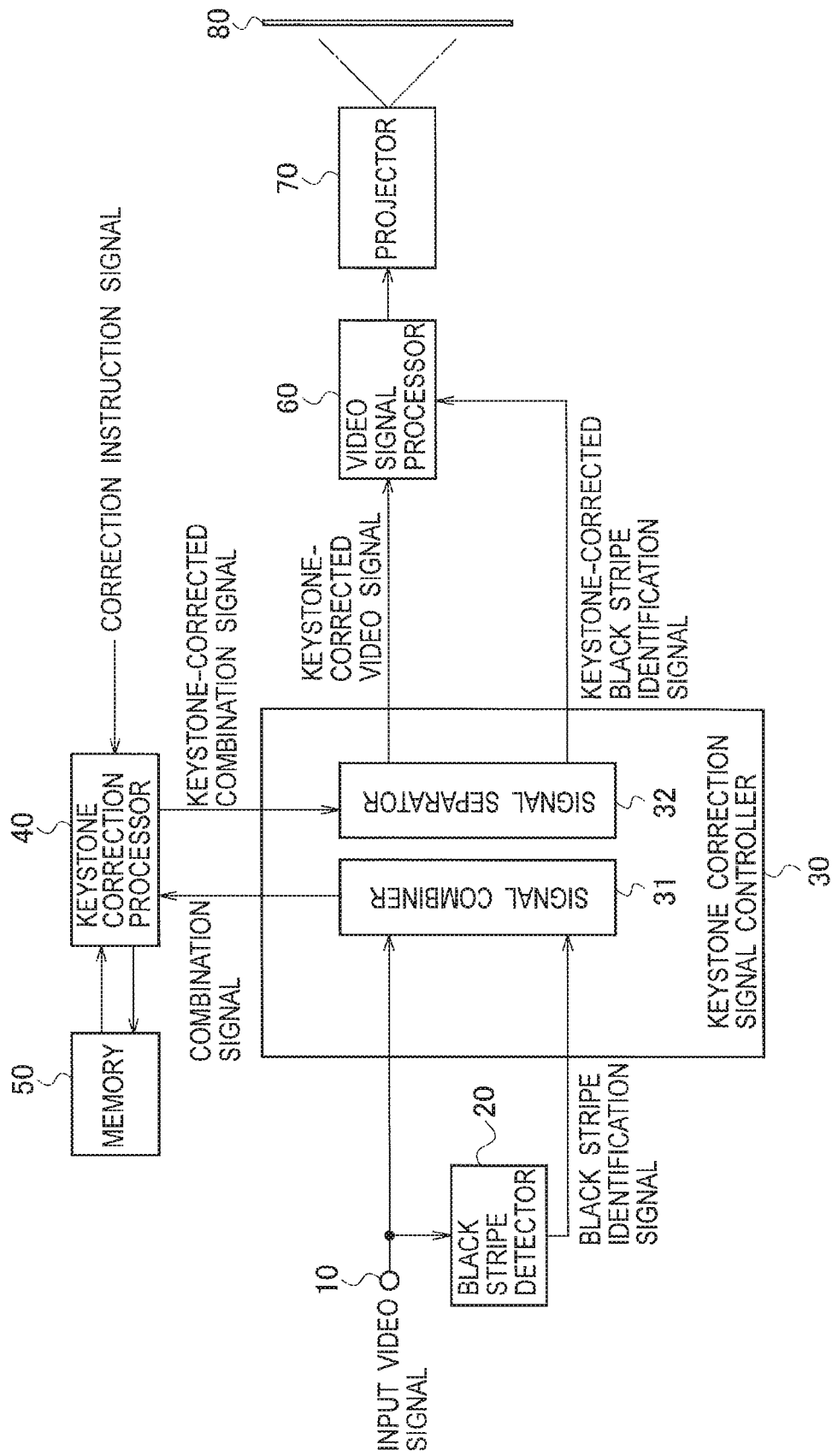
FIG. 1 is a block diagram showing a video signal processing device and a projection-type display device according to the first embodiment.

In FIG. 1, a video signal, in which a part of an effective region is a black stripe region, is inputted to an input terminal 10. The video signal inputted to the input terminal 10 is referred to as an input video signal. As an example, as shown in FIG. 2, the input video signal is a video signal, in which such black stripe regions SbR and SbL are added to the right and left sides of a video region S0 with an aspect ratio 4:3, respectively, whereby a video S1 with an aspect ratio 16:9 is formed.

The input video signal may be a video signal, in which the black stripe regions are added to the right and left sides of a video region with a first aspect ratio, whereby a video with a second aspect ratio is formed, or may be a video signal in which the black stripe regions are added to upper and lower sides of the video with the first aspect ratio, whereby the video with the second aspect ratio is formed. The input video signal is a video signal in which the black stripe regions are a part of the effective region.

The input video signal is inputted to a black stripe detector 20 and a keystone correction signal controller 30. The keystone correction signal controller 30 includes a signal combiner 31 and a signal separator 32. By an arbitrary technique such as a black stripe region detection circuit described in Japanese Patent No. 5010262, the black stripe detector 20 detects whether or not the black stripe regions are present, and detects which portions of a video are the black stripe regions.

Figures 2, 3:
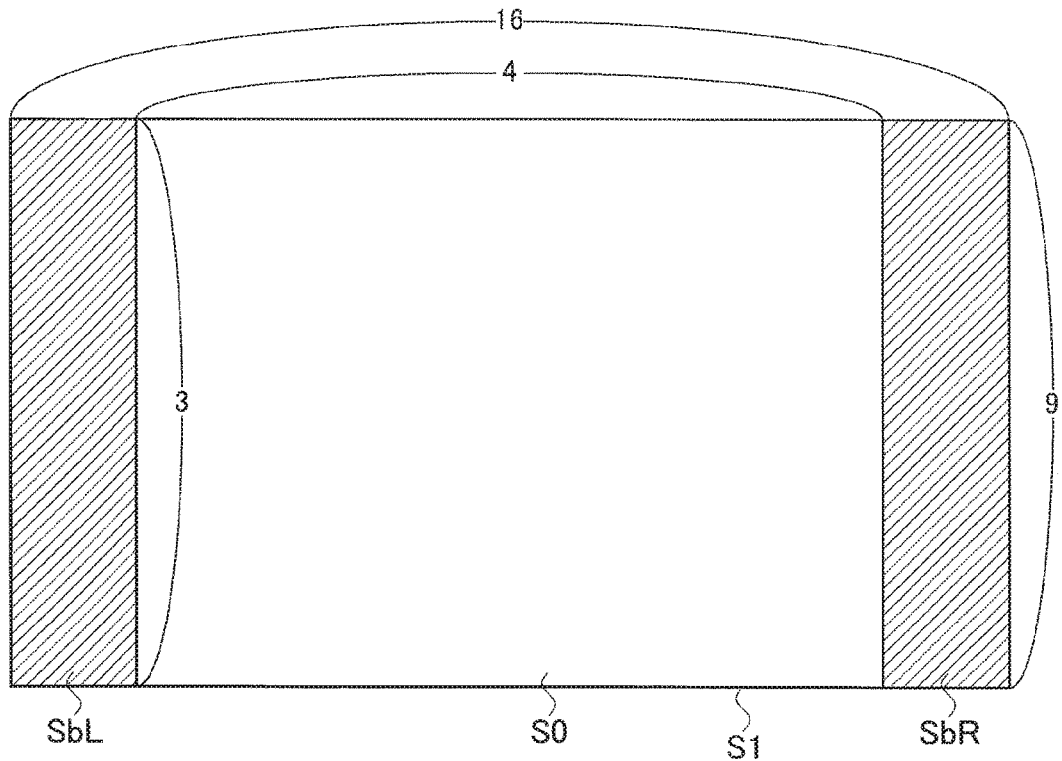
FIG. 2 is a view showing an example of a video signal having black stripe regions.
FIG. 3 is a diagram showing an example of a black stripe identification signal.

As shown in FIG. 3, based on a detection result of the black stripe regions, for example, the black stripe detector 20 generates a black stripe identification signal that assigns "1" to pixels included in a black stripe region SbR or SbL in FIG. 2, and assigns "0" to pixels included in a video region S0 therein. In FIG. 3, the respective pixels are enlarged for convenience of illustration.

That is, the black stripe identification signal is a signal in which "1", indicating that each pixel belongs to the black stripe region SbR or SbL, or "0", indicating that each pixel belongs to the video region S0, is assigned in the same pixel unit as that of the video signal.

The signal combiner 31 combines the video signal and the black stripe identification signal with each other. For example, if the video signal is an 8-bit one, then as an example, the signal combiner 31 adds a 1-bit black stripe identification signal to a least significant bit side of 8 bits, and generates a 9-bit combination signal. At this time, the signal combiner 31 establishes a correspondence between a pixel position of the video signal and a pixel position of the black stripe identification signal, both of which are the same pixel position.

The way to combine the video signal and the black stripe identification signal with each other by the signal combiner 31 is not limited to the above-described example. When keystone correction processing is implemented for the video signal, as will be described later, the video signal and the black stripe identification signal just need to be combined with each other so that similar correction processing is also implemented for the black stripe identification signal.

The combination signal is inputted to a keystone correction processor 40. A correction instruction signal is inputted to the keystone correction processor 40. The correction instruction signal is generated in such a manner that a user operates an operation unit (not shown), in order to correct a trapezoidal distortion of the video signal projected onto a screen 80.

The video signal processing device may be configured to automatically generate the correction instruction signal.

The keystone correction processor 40 writes the combination signal, which is inputted thereto into a memory 50, and reads the combination signal from the memory 50 so that the keystone correction processing is implemented, and thereby generates a keystone-corrected combination signal.

Figure 4:
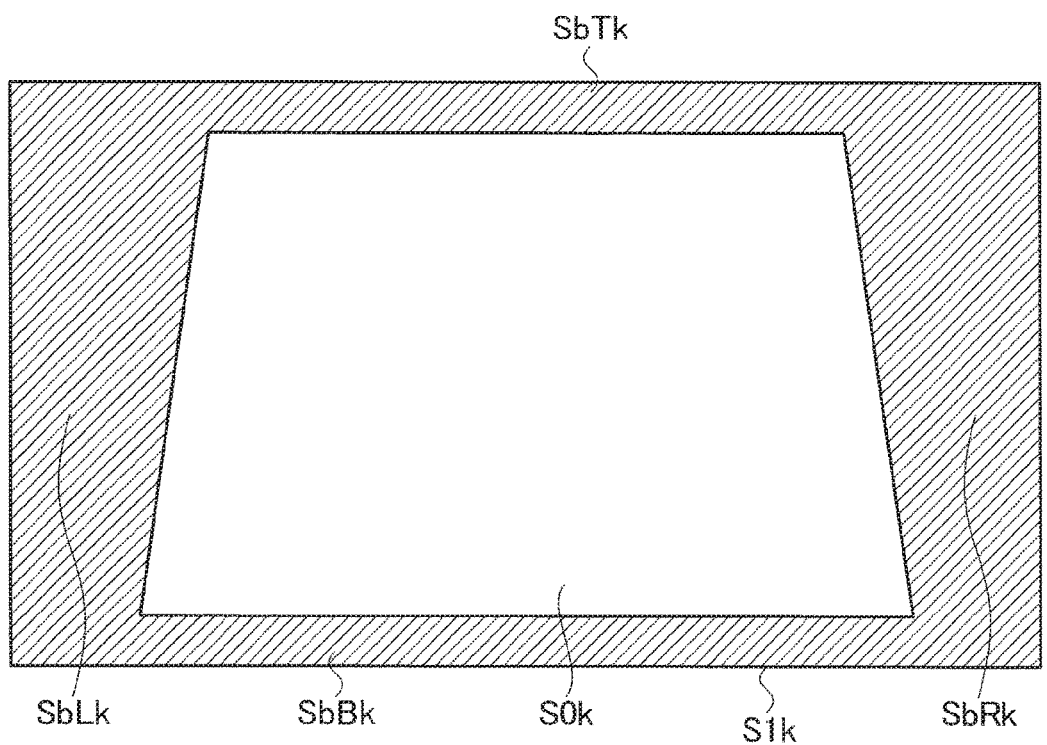
FIG. 4 is a view showing an example of a video signal subjected to keystone correction.

In the case where a trapezoidal distortion of a projection video displayed on the screen 80 is a trapezoidal distortion in a state where an upper side thereof in the vertical direction is wide and a lower side thereof is narrow, the keystone-corrected combination signal generated by the keystone correction processor 40 is a signal like a video S1$k$ shown in FIG. 4.

As shown in FIG. 4, the video region S0 shown in FIG. 2 is converted into a video region S0$k$ in which an upper side in the vertical direction is narrow and a lower side therein is wide. The right and left black stripe regions SbR and SbL are converted into black stripe regions SbRk and SbLk in which upper sides in the vertical direction are wide and lower sides therein are narrow. In order to allow an aspect ratio of the video region S0$k$ to coincide with the aspect ratio of the video region S0, black stripe regions SbTk and SbBk are added to the upper and lower sides of the video region S0$k$, respectively.

The keystone correction processor 40 generates the keystone-corrected combination signal, which is shown in FIG. 4, based on the combination signal in which the input video signal and the black stripe identification signal are combined with each other. Hence, the keystone-corrected combination signal becomes a signal in which "1" is assigned to pixels included in the black stripe region SbRk, SbLk, SbTk or SbBk, and "0" is assigned to pixels included in the video S0$k$.

The keystone-corrected combination signal is inputted to the signal separator 32. The signal separator 32 separates higher-order 8 bits and such a least-significant 1 bit from each other, and thereby generates a keystone-corrected video signal and a keystone-corrected black stripe identification signal from each other. The keystone-corrected video signal and the keystone-corrected black stripe identification signal are inputted to a video signal processor 60.

The video signal processor 60 implements predetermined video signal processing for the keystone-corrected video signal. For example, the video signal processor 60 is a video signal processing circuit that increases an amount of information of the video signal and improves image quality of a display video. By using a memory (not shown), the video signal processor 60 implements the video signal processing for the keystone-corrected video signal.

Specifically, as an example, the video signal processor 60 is a frame rate conversion circuit, which generates an interpolation frame, and inserts the generated interpolation frame between frames adjacent to each other, and thereby converts a frame rate of the keystone-corrected video signal. As another example, the video signal processor 60 is an up-conversion circuit (resolution conversion circuit), which increases the number of lines in 1 frame, increases the number of pixels in 1 line, and thereby increases the resolution.

For example, the frame rate conversion circuit converts a video signal with a frame frequency of 60 Hz into a video signal with a frame frequency of 120 Hz or 240 Hz. For example, the up-conversion circuit converts an NTSC signal into a high vision signal.

It is necessary for the video signal processor 60 to generate the interpolation frame and generate an up-converted video signal by using a pixel signal of the video region S0$k$ in FIG. 4.

To the video signal processor 60, there are inputted: the keystone-corrected video signal, and the keystone-corrected black stripe identification signal, which properly identifies a portion of the black stripe region SbRk, SbLk, SbTk or SbBk and a portion of the video S0$k$ in the keystone-corrected video signal from each other. Hence, the video signal processor 60 can implement the video signal processing for improving the image quality by using the pixel signal of the video region S0$k$.

In the interpolation frame generation in the frame rate conversion circuit and the interpolation pixel generation in the up-conversion circuit, if the pixels of the black stripe region are referred to in the event of generating the pixels of the effective region, then undesirably, such interpolation pixels are generated that allow the black stripe to enter an interpolation effective region. On the contrary, if the pixels of the effective region are referred to in the event of generating the pixels of the black stripe region, then undesirably, such interpolation pixels are generated that allow the effective region to extend over an interpolated black strip region.

The corrected black stripe information is inputted to the video signal processor 60, and accordingly, the pixels of the region determined to be the black stripe region can be avoided being used for the interpolation of the effective region, and the pixels the effective region can be avoided being used for the interpolation of the region determined to be the black stripe region.

Hence, the video signal processor 60 individually uses the pixel signal of the video region S0k and the pixel signal on the outside of the video region S0k in an appropriate manner, and can thereby implement the video signal processing for improving the image quality while preventing a deterioration of the image quality.

A projector 70 projects video light, which is based on the video signal outputted from the video signal processor 60, onto the screen 80. For example, the projector 70 includes: a liquid crystal panel for writing the video signal; a light source for irradiating projection light onto the liquid crystal panel; and a projection optical system for projecting the light, which transmits through or is reflected on the liquid crystal panel, and onto the screen 80.

In accordance with the video signal processing device and the projection-type display device according to the first embodiment described above, the black stripe detector 20 detects the black stripe regions based on the video signal that is not subjected to the keystone correction processing yet, and accordingly, the black stripe regions are detected appropriately.

In accordance with the video signal processing device and the projection-type display device according to the first embodiment, the keystone correction processor 40 implements the keystone correction processing for the video signal (combination signal) before the video signal processor 60 implements the video signal processing for the video signal, and accordingly, the cost of the device is not increased unnecessarily.

Hence, in accordance with the video signal processing device according to the first embodiment, it is possible to appropriately execute the black stripe region detection function, the keystone correction function, and the video signal processing function, without unnecessarily increasing the cost of the device.

Second Embodiment

In a second embodiment shown in FIG. 5, the same reference numerals are assigned to the same portions as those of the first embodiment shown in FIG. 1, and a description thereof is omitted.

In FIG. 5, the keystone correction signal controller 30 includes a video filter processor 33 and a black stripe filter processor 34 in addition to the signal combiner 31 and the signal separator 32.

The video filter processor 33 implements filtering processing which uses peripheral pixels for each of the pixels of the video signal inputted to the signal combiner 31. The black stripe filter processor 34 implements filtering processing which uses signals in the same range as that of the peripheral pixels in the video filter processor 33 for a signal of each pixel unit of the black stripe identification signal.

As understood from a comparison between FIG. 2 and FIG. 4, the video region s0 is converted into the video region S0k with a small area by the keystone correction processing. The filtering processing, which uses the peripheral pixels, is implemented by the video filter processor 33 and the black stripe filter processor 34, whereby the processing is performed so that information to be deleted partially remains.

The video filter processor 33 and the black stripe filter processor 34 can be composed of low-pass filters or median filters.

Preferably, the above-described peripheral pixels in the video filter processor 33 and the black stripe filter processor 34 are varied in response to an extent of the reduction when the video region S0 is converted into the video region S0k. Preferably, a region of the peripheral pixels is increased as the extent of the reduction is larger.

In FIG. 5, the video filter processor 33 and the black stripe filter processor 34 are provided; however, the black stripe filter processor 34 may be omitted, and only the video filter processor 33 may be used.

The present invention is not limited to the first and second embodiments described above, and is changeable in various ways within the scope without departing from the scope of the present invention. The respective constituents of FIG. 1 and FIG. 5 may be composed of hardware or software. The choice of hardware or software is optional.

What is claimed is:

1. A video signal processing device comprising: a black stripe detector to detect whether or not each pixel of an input video signal, in which a part of an effective region is a black stripe region, is a pixel included in the black stripe region, and to generate a black stripe identification signal; a signal combiner to combine the input video signal and the black stripe identification signal with each other to generate a combination signal; a keystone correction processor to implement keystone correction processing for the combination signal so as to correct a trapezoidal distortion when the input video signal is projected onto a screen, and to generate a keystone-corrected combination signal;
    a signal separator to separate the keystone-corrected combination signal into a keystone-corrected video signal subjected to the keystone correction processing and a keystone-corrected black stripe identification signal indicating whether or not each pixel of the keystone-corrected video signal is a pixel included in a black stripe region; and a video signal processor to implement predetermined video signal processing for the keystone-corrected video signal by using the keystone-corrected video signal and the keystone-corrected black stripe signal.

2. The video signal processing device according to claim 1, further comprising a video filter processor to implement filtering processing, which uses peripheral pixels for each of pixels of the input video signal inputted to the signal combiner.

3. The video signal processing device according to claim 2, further comprising a black stripe filter processor to implement filtering processing, which uses signals in the same range as the range of the peripheral pixels for the signal of each pixel unit of the black stripe identification signal.

4. The video signal processing device according to claim 2, wherein the video filter processor is a low-pass filter or a median filter.

5. The video signal processing device according to claim 3, wherein the black stripe filter processor is a low-pass filter or a median filter.

6. The video signal processing device according to claim 1, wherein the video signal processor is a frame rate conversion circuit to convert a frame rate of the keystone-corrected video signal or an up-conversion circuit to increase a resolution of the keystone-corrected video signal.

7. A projection-type display device comprising: the video signal processing device according to claim 1; and a projector to project a video signal which is outputted from the video signal processor onto the screen.

\* \* \* \* \*